United States Patent [19]

Wells et al.

[11] Patent Number: 4,951,918
[45] Date of Patent: Aug. 28, 1990

[54] VALVE VENT

[75] Inventors: Gordon K. Wells; Max L. Green, both of Mansfield, Ohio

[73] Assignee: Therm-O-Disc, Incorporated, Mansfield, Ohio

[21] Appl. No.: 505,570

[22] Filed: Apr. 6, 1990

[51] Int. Cl.5 ............................................. F16K 31/00
[52] U.S. Cl. ..................................... 251/321; 137/495
[58] Field of Search .................... 137/495; 239/29, 32; 251/319–323

[56] References Cited

U.S. PATENT DOCUMENTS

| | | | |
|---|---|---|---|
| 2,550,863 | 5/1951 | Roehr | 251/321 |
| 3,033,466 | 5/1962 | Sorensen | 251/323 X |
| 4,481,971 | 11/1984 | Farrell | 137/495 X |

Primary Examiner—Robert G. Nilson
Attorney, Agent, or Firm—Jones, Day, Reavis & Pogue

[57] ABSTRACT

A valve assembly has a valve operting button with an outwardly extending button flange received in a cavity. Liquid entering the cavity floats the button to move the button flange into engagement with a surface, and this tends to seal the cavity and cause liquid pressure buildup therein. A venting path between the button flange & the surface it engages prevents sealing of the cavity, and prevents liquid pressure buildup therein.

18 Claims, 3 Drawing Sheets

VALVE VENT

BACKGROUND OF THE INVENTION

This application relates to the art of valves and, more particularly, to valves having a manually operable button for opening and closing same. The invention is particularly applicable to bubbler valves for water fountains and will be described with particular reference thereto. However, it will be appreciated that the invention has broader aspects and can be used with other types of valves.

Bubbler valves for water fountains sometimes develop a leak that pressurizes a cavity beneath a manually operable button. At high enough pressures, the pressurized water operates the valve causing an unattended fountain to discharge water on the surroundings.

It would be desirable to have an arrangement for preventing pressurization of the cavity beneath the manually operable button on a water fountain bubbler valve.

SUMMARY OF THE INVENTION

A valve assembly of the type described has venting path means for preventing pressurization of the cavity beneath the manually operable button. The venting path means allows a slow escape of water from the cavity so it simply flows into the drain on the water fountain.

The improvement of the present application is incorporated in a valve assembly including an opening through which the manually operable button extends. The button has an outwardly extending flange located in a cavity. Water entering the cavity causes the button to float until the flange upper surface engages a cavity peripheral surface adjacent the opening. The venting path means is preferably on at least one of the flange surface or the peripheral surface for preventing sealing engagement therebetween, to thereby prevent the cavity from being pressurized.

In one arrangement, the venting path means comprises at least one circumferential interruption in the button flange.

In another arrangement, the venting path means comprises at least one deformity on the flange for rendering the upper surface thereof non-planar to prevent sealing engagement thereof with the cavity peripheral surface. The deformity can be either a formed projection, or a depressed area coined into the flange.

In another arrangement, the venting path means may comprise knurling or scoring on one or both of the flange surface and the cavity peripheral surface.

It is a principal object of the present invention to provide a valve assembly that includes means for preventing the pressurization of a cavity having an opening through which a manually operable button extends for operating the valve.

It is another object of the invention to provide such a valve having venting path means between a button flange and a cavity peripheral surface.

It is also an object of the invention to provide such a valve having an arrangement for preventing pressurization of the cavity that is very economical to manufacture and assemble.

It is a further object of the invention to provide an improved valve operating button having means thereon for preventing pressurization of a cavity in which a portion of the button is received.

DESCRIPTION OF PREFERRED EMBODIMENTS

Figure 1:
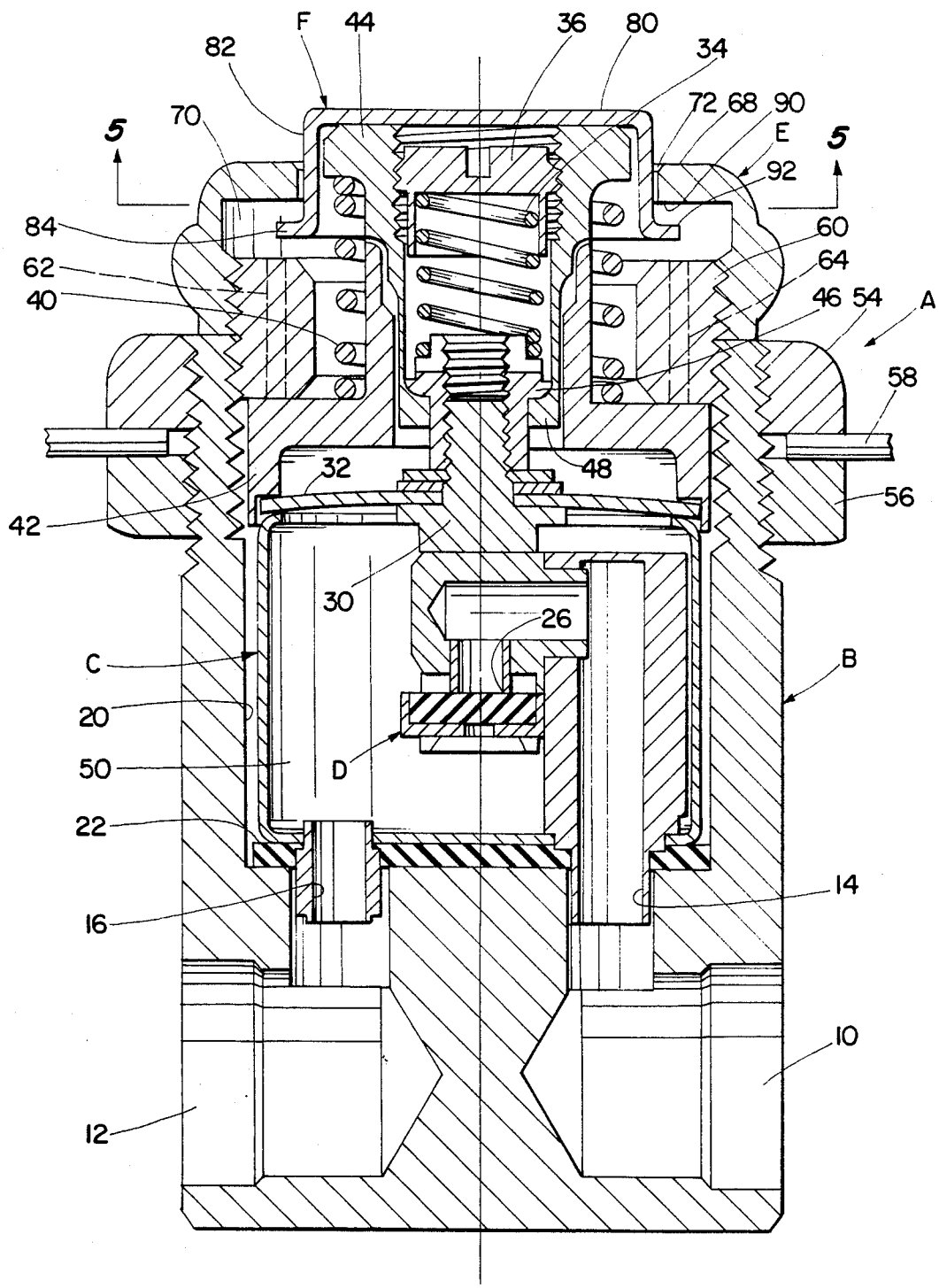
FIG. 1 is a cross-sectional elevational view of a valve in which the improvement of the present application is used.

Referring now to the drawing, wherein the showings are for purposes of illustrating certain preferred embodiments of the invention only and not for purposes of limiting same, FIG. 1 shows a valve assembly A of the type used on a water fountain.

Valve assembly A includes a housing B having supply and discharge ports 10, 12 communicating with inlet and outlet ports 14, 16 on a flow regulator cartridge C received in a housing pocket 20.

An elastomeric gasket 22 is positioned between the bottom of housing pocket 20 and the bottom of flow regulator cartridge C in surrounding sealing relationship to inlet and outlet ports 14, 16 for normally preventing leakage of water past gasket 22 up into housing pocket 20 around the periphery of cartridge C.

Flow regulator cartridge C includes a movable valve member D cooperating with a valve outlet seat 26 for selectively opening and closing same. Valve member D is mounted on an elongated stem 30 attached to a flexible diaphragm 32. A coil spring 34 acts between the upper end of stem 30 and the bottom end of an adjusting screw 36. Adjustment of adjusting screw 36 varies the downward biasing force of spring 34 on stem 30.

Another coil spring 40 acts between a flow regulator cartridge cover 42 and an outwardly extending flange on a reciprocating operating member 44. Stem 30 and operating member 44 have cooperating abutments 46, 48 thereon so that the upward biasing force of spring 40 on operating member 44 pulls stem 30 upwardly and engages valve member D with seat 26 to close same. Downward movement of operating member 44 overcomes the biasing force of spring 40 thereon and increases the biasing force of spring 34 on stem 30. Downward movement of operating member 44 allows stem 30 to move downwardly for moving valve member D away from seat 26 to allow water flow therethrough into a valve cartridge chamber 50, and to outlet port 16. The pressure in cartridge chamber 50 acts on diaphragm 32 to modulate the position of stem 30, hence the position of valve member D relative to seat 26 when operating member 44 is manually depressed. When operating member 44 is pushed down, the abutments 46, 48 separate because stem 30 is then left suspended by diaphragm 32. After this happens, the diaphragm action controls the position of the valve member D relative to seat 26 and regulates the amount of water discharged by the drinking fountain.

Internally threaded assembly nuts 54, 56 are threaded on an externally threaded portion of housing B on opposite sides of a water fountain pan 58 or the like for mounting valve assembly A thereto.

An externally threaded flow cartridge securing nut 60 is threadably engaged with internal threads on housing B, and engages flow cartridge cover 42 for biasing cartridge C downwardly to firmly seal the bottom of same against gasket 22. Flow cartridge securing nut 60 has axial holes 62, 64 therethrough for receiving a spanner wrench for installing and removing same.

An internally threaded finish nut E is threaded onto flow cartridge securing nut 60, and has an inwardly extending flange 68 spaced from the top end of flow cartridge retaining nut 60 to define a cavity 70. A central circular opening 72 in nut E communicates with cavity 70.

A cup-like operating button F includes a substantially flat circular base 80 having a substantially cylindrical peripheral wall 82 extending therefrom and terminating in an outwardly extending circumferential flange 84 located within cavity 70. Button peripheral wall 82 extends through opening 72, and the inner surface of base 80 rests against the upper end of operating member 44. Manual downward pressure on button base 80 moves operating member 44 downwardly to open valve member D. Releasing the manual pressure on button F allows the button and operating member 44 to again move upwardly for engaging valve member D with seat 26.

A flat cavity peripheral surface 90 on flange 68 around opening 72 faces toward cavity 70. An upper flange surface 92 on button flange 84 faces cavity peripheral surface 90. When repairs are made in the field, one or more of cartridge C, gasket 22 or cartridge securing nut 60 may be improperly installed, or nut 60 may be inadequately tightened, such that unintended water flow will occur past gasket 22 upwardly into housing pocket 20 around cartridge C. This will cause water to enter cavity 70 by flowing through one or more paths defined between the bottom of nut 60 and the top of cartridge cover 42, through spanner wrench holes 62, 64, or along the threaded surfaces between nut 60, housing B and nut E.

Water entering and flooding cavity 70 will cause button F to float upwardly off operating member 44 until flange surface 92 engages cavity peripheral surface 90. Surfaces 90, 92 are usually smooth, planar and parallel to one another to provide a sufficient seal for pressurizing cavity 70. Flange 84 also makes sealing engagement with the peripheral edge defined at the intersection of opening 72 with cavity peripheral surface 92. Once the seal is created, pressure can then build up in cavity 70 until it is equal to the pressure of the incoming water supply. This pressure is applied to the face of the actuating member 44 of the cartridge, and can force it down and open valve D. When button F is then manually operated downwardly, surfaces 90, 92 are separated for allowing the pressurized water in cavity 70 to escape through opening 72 outwardly of button peripheral wall 82. The pressurized water exiting through the small opening may spray the person operating the button and/or the surroundings.

In accordance with the present application, venting path means is provided for preventing cavity peripheral surface 90 and flange surface 92 from sealing with one another to allow pressurization of cavity 70. The venting path means also prevents sealing between the upper surface of button flange 84 and the peripheral edge defined by the intersection of opening 72 with cavity peripheral surface 90. The venting path means is preferably located between button flange 84 and cavity peripheral surface 90 to allow venting of water therepast where it will slowly trickle through opening 72 and into the drain provided in pan 58.

Figure 2:
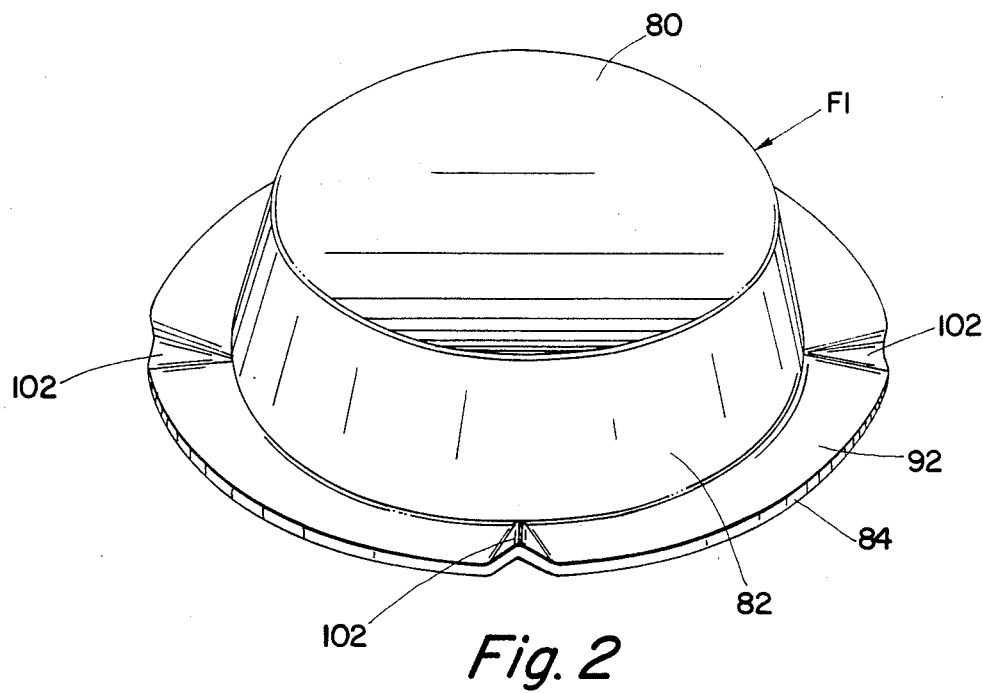
FIG. 2 is a perspective illustration of a valve operating button.

The venting path means may take many forms. In one arrangement shown in FIG. 2, button F1 has a plurality of circumferentially-spaced upwardly extending deformities 102 in flange 84 rendering upper surface 92 thereof non-planar so that it cannot seal against cavity peripheral surface 90.

Figure 3:
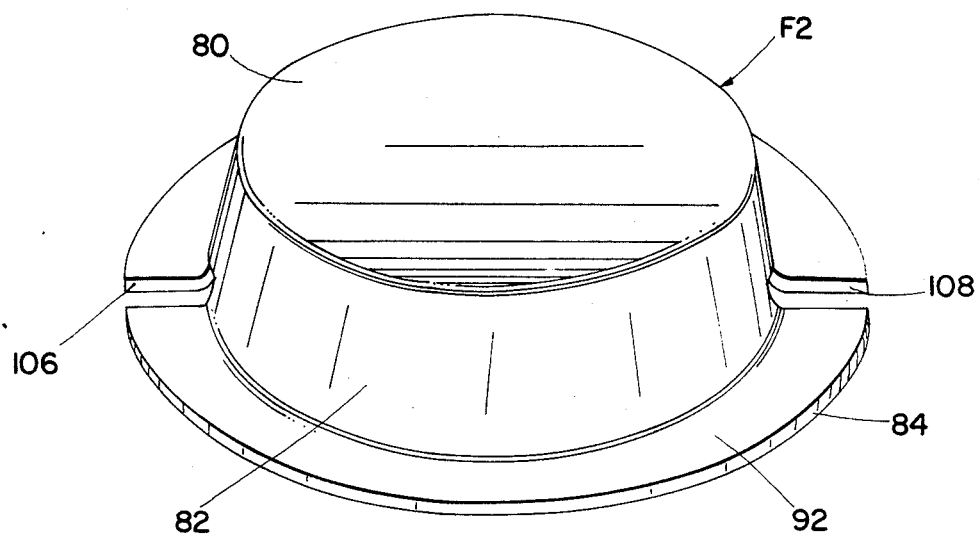
FIG. 3 is a perspective illustration of another embodiment.

In the arrangement of FIG. 3, button F2 has a plurality of circumferential discontinuities 106, 108 defined by slots through flange 84 that extend at least partly into button peripheral wall 82 so that flange upper surface 92 cannot seal against cavity peripheral surface 90, or the edge between such surface and opening 72.

Figure 4:
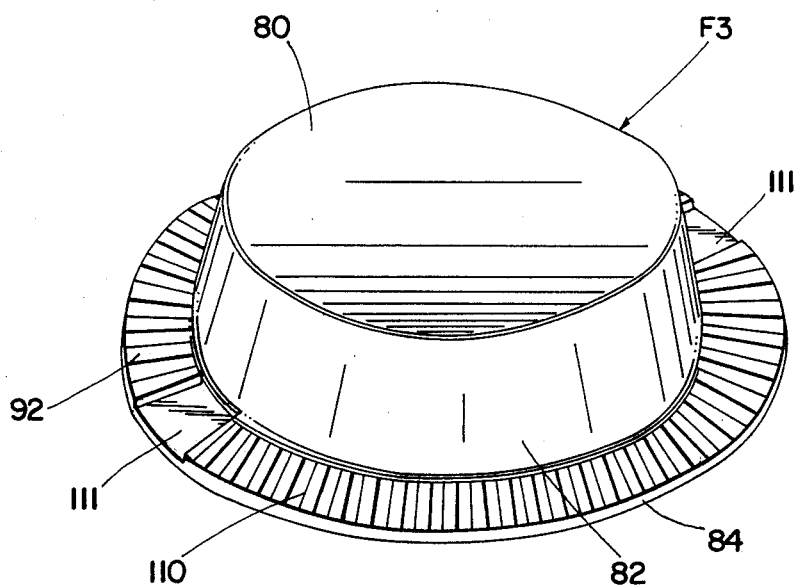
FIG. 4 is a perspective illustration of still another embodiment.

In the arrangement of FIG. 4, button F3 has a plurality of radial grooves, serrations or knurling in upper flange surface 92 to render same non-planar, and rough instead of smooth. Such grooves, serrations or knurling provide a venting path for preventing sealing engagement between cavity peripheral surface 90 and flange surface 92 that would allow pressurization of cavity 70. FIG. 4 also shows alternative venting means in the form of coined recesses 111 in upper surface 92 of button flange 84, and at least part of button peripheral wall 82 adjacent its intersection with flange 92.

Figure 5:
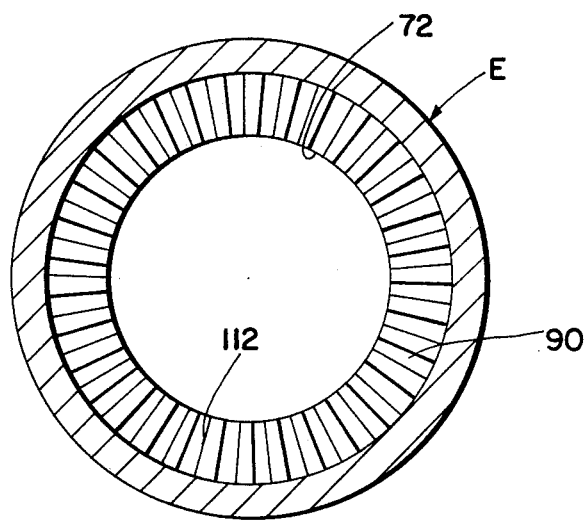
FIG. 5 is a partial cross-sectional plan view taken generally on line 5—5 of FIG. 1, and with portions omitted for clarity of illustration.

In the arrangement of FIG. 5, cavity peripheral surface 90 around opening 72 has a plurality of radial grooves or knurling 112 formed therein for preventing sealing engagement between cavity peripheral surface 90 and flange surface 92. The grooves, knurling or seal preventing roughness 110, 112 may be provided around the entire periphery of surfaces 90, 92, or along one or more short arcs thereof. Likewise, the same or different types of grooves, knurling or surface roughness may be provided on only one or both of surfaces 90, 92.

When valve member D engages seat 26, a stop means is provided to prevent further upward movement of operating member 44 and button F under the biasing force of the biasing means defined by spring 40. This is because abutments 46, 48 on stem 30 and operating member 44 engage one another. In this position, flange 84 is normally spaced downwardly from cavity peripheral surface 90 as shown in FIG. 1. Water slowly rising in cavity 70 will seal around button flange 84, and trap air within button F. As the water continues to rise in cavity 70, surface 92 on button flange 84 will engage cavity peripheral surface 90. The venting path means of the present application allows water to trickle from cavity 70 between surfaces 90, 92, and through opening 72.

Other vent means are possible for venting cavity 70 to atmosphere externally of the valve assembly. For example, it is possible to provide a transverse hold through part of the housing for connecting cavity 70 with atmosphere. It is also possible to removably secure button F to operating member 44 so that button F cannot float upwardly to sealing engage button flange surface 92 with cavity peripheral surface 90. This would provide a vent in the clearance between the periphery of opening 72 and peripheral wall 82 of button F. Arranging the valve such that upper surface 92 of button flange 84 is always spaced from cavity peripheral surface 90 provides a means for preventing surfaces 90, 92 from sealing engagement with one another. This seal preventing means combined with the vent means insures that water pressure cannot build up in cavity 70.

Although the invention has been shown and described with respect to certain preferred embodiments, it is obvious that equivalent alterations and modifications will occur to others skilled in the art upon the reading and understanding of this specification. The present invention includes all such equivalent alterations and modifications, and is limited only by the scope of the claims.

We claim:

1. In a valve assembly having a manually operable movable button for selectively opening a valve to flow of liquid therethrough, said button being generally cup-shaped and including a base having a peripheral wall extending therefrom, said peripheral wall terminating in an outwardly extending flange, said valve assembly including a cavity in which said flange is received, said cavity including an upper wall having an opening therein through which said peripheral wall of said button extends with said base thereof located on the opposite side of said upper wall from said cavity, said upper wall having a peripheral surface facing toward said cavity around said opening, said flange having a flange surface facing toward said peripheral surface, said button being movable in a direction outwardly of said opening for engaging said flange surface with said peripheral surface responsive to liquid flooding said cavity, and at least one of said flange and said peripheral surface having venting path means thereon for providing a venting path between said cavity and said opening when said flange and peripheral surfaces are in engagement with one another, said venting path means preventing liquid pressure buildup in said cavity.

2. The valve assembly of claim 1 wherein said venting path means comprises deformation means on said flange surface for rendering said flange surface non-planar.

3. The valve assembly of claim 1 wherein said venting path means is between said flange surface and said peripheral surface.

4. The valve assembly of claim 1 wherein said venting path means is on said flange.

5. The valve assembly of claim 1 wherein said venting path means is on said peripheral surface.

6. The valve assembly of claim 1 wherein said venting path means comprises at least one circumferential interruption in said flange.

7. The valve assembly of claim 1 wherein said venting path means comprises deformities in at least one of said flange surface and peripheral surface for rendering same rough and incapable of sealing with one another to prevent liquid flow therepast.

8. The valve assembly of claim 1 including biasing means for normally biasing said button in a direction for moving said flange toward said peripheral surface, stop means for stopping biasing action of said biasing means on said button when said button flange is spaced from said peripheral surface.

9. A cup-shaped valve operating button including a base having a peripheral wall extending therefrom and terminating in an outwardly extending flange having a flange surface facing back in a direction toward said base, said flange including venting path means for preventing said flange surface from sealing against another surface.

10. The button of claim 9 wherein said venting path means comprises at least one circumferential discontinuity in said flange.

11. The button of claim 9 wherein said venting path means comprises at least one deformity in said flange rendering said flange surface non-planar.

12. The button of claim 9 wherein said venting path means comprises deformities in said flange surface rendering such flange surface rough.

13. In a valve assembly including a valve operating button extending through an opening to a cavity, said button being generally cup-shaped to include a base outside said cavity and having a peripheral wall extending therefrom and through said opening and terminating in an outwardly extending flange received in said cavity, said flange and cavity having opposed surfaces facing one another and being engageable with one another upon movement of said button in a direction outwardly of said opening, said button being floatable in a direction out of said opening responsive to filling of said cavity with liquid until said flange and cavity surfaces engage one another, and venting path means on at least one of said flange and cavity surfaces for preventing sealing between said flange and cavity surfaces and thereby preventing liquid pressure buildup in said cavity.

14. The valve assembly of claim 13 wherein said venting path means is on said cavity surface.

15. The valve assembly of claim 13 wherein said venting path means is on said button flange.

16. The valve assembly of claim 13 wherein said venting path means comprises at least one circumferential discontinuity in said flange.

17. The valve assembly of claim 13 wherein said venting path means includes deformities on said flange rendering said flange surface non-planar.

18. In a valve assembly having a manually operable movable button for selectively opening a valve to flow of liquid therethrough, said button being generally cup-shaped and including a base having a peripheral wall extending therefrom, said peripheral wall terminating in an outwardly extending flange, said valve assembly including a cavity in which said flange is received, said cavity including an upper wall having an opening therein through which said peripheral wall of said button extends with said base thereof located on the opposite side of said upper wall from said cavity, said upper wall having a peripheral surface facing toward said cavity around said opening, said flange having a flange surface facing toward said peripheral surface, said button being movable in directions inwardly and outwardly of said cavity for respectively opening and closing a valve and during which movement said flange surface moves away from and toward said cavity peripheral surface, and cavity vent means for venting said cavity to the environment externally of said valve assembly to prevent pressure buildup in said cavity.

* * * * *